United States Patent [19]
Ortiz, Jr.

[11] Patent Number: 5,333,218
[45] Date of Patent: Jul. 26, 1994

[54] OPTICAL FIBER TAPERED OUTPUT END PREPARATION FOR IMPROVED HIGH POWER LASER/FIBER DELIVERED BEAM QUALITY

[75] Inventor: Angel L. Ortiz, Jr., Scotia, N.Y.

[73] Assignee: General Electric Company, Schenectady, N.Y.

[21] Appl. No.: 65,382

[22] Filed: May 24, 1993

[51] Int. Cl.$^5$ .............................................. G02B 6/26
[52] U.S. Cl. .................................... 385/43; 385/76; 385/88
[58] Field of Search .................... 385/43, 31, 33, 34, 385/76, 77, 88

[56] References Cited

U.S. PATENT DOCUMENTS

| | | | |
|---|---|---|---|
| 3,419,321 | 12/1968 | Barber et al. | 219/121.7 |
| 4,275,288 | 6/1981 | Makosch et al. | 219/121.75 |
| 4,500,164 | 2/1985 | Kiyohara | 385/43 |
| 4,521,070 | 6/1985 | Sottini et al. | 385/43 |
| 4,564,736 | 1/1986 | Jones et al. | 219/121.6 |
| 4,654,532 | 3/1987 | Hirschfeld | 250/458.1 |
| 4,676,586 | 6/1987 | Jones et al. | 385/33 |
| 4,681,396 | 7/1987 | Jones | 385/33 |
| 4,697,867 | 10/1987 | Blanc et al. | 385/43 |
| 4,763,976 | 8/1988 | Nolan et al. | 385/43 |
| 4,795,228 | 1/1989 | Schneider | 385/43 |
| 4,799,755 | 1/1989 | Jones | 385/38 |
| 4,807,954 | 2/1989 | Oyamada et al. | 385/43 |
| 4,844,574 | 7/1989 | Chande | 385/33 |
| 4,946,239 | 8/1990 | Garmon | 385/43 |
| 4,984,885 | 1/1991 | Ortiz, Jr. | 356/153 |
| 4,997,250 | 3/1991 | Ortiz, Jr. | 385/33 |
| 5,138,676 | 8/1992 | Stowe et al. | 385/32 |

OTHER PUBLICATIONS

"On-The-Fly Drilling with a Fiber Delivered Face Pumped Laser Beam", by Angel L. Ortiz, Jr., Journal of Laser Applications, vol. 4, No. 2, Spring/Summer 1992.

*Primary Examiner*—Frank Gonzalez
*Attorney, Agent, or Firm*—Paul R. Webb, II

[57] ABSTRACT

This invention relates to a method for providing control of high power laser-fiber delivered beam quality. Such structures of this type, generally, use a tapered fiber output end preparation to improve the beam quality of fiber delivered laser beams.

7 Claims, 3 Drawing Sheets

OPTICAL FIBER TAPERED OUTPUT END PREPARATION FOR IMPROVED HIGH POWER LASER/FIBER DELIVERED BEAM QUALITY

BACKGROUND OF THE INVENTION

1. Field of the Invention

This invention relates to a method for providing control of high power laser-fiber delivered beam quality. Such structures of this type, generally, use a fiber output end preparation to improve the beam quality of fiber delivered laser beams.

2. Description of the Related Art

Laser materials processing as known in the art and as used herein refers to performance of materials processes, such as cutting, welding, drilling and soldering, with a high a power continuous wave or pulsed laser beam. The average power of a high power laser beam may range from as little as approximately 1 watt to hundreds of watts. A user selects the specific power of the beam on the basis of a particular process being performed.

Known art describes transmitting a laser beam from a laser source to the vicinity of a workpiece by means of an optical fiber. For example, an apparatus and method for injecting a power laser beam into an optical fiber for transmission therethrough are described in commonly assigned U.S. Pat. Nos. 4,564,736, 4,676,586, and 4,681,396, respectively entitled "Industrial Hand Held Laser Tool and Laser System", "Apparatus and Method for Performing Laser Material Processing Through a Fiber Optic", and "High Power Laser Energy Delivery System", the disclosure of each of these patents being incorporated in their entirety herein by reference.

Transmitting a laser beam through an optical fiber to an output coupler also is known. Such an apparatus is described in commonly assigned U.S. Pat. No. 4,799,755, entitled "Laser Materials Processing with a Lensless Fiber Optic Output Coupler", the disclosure of which is incorporated in its entirety herein by reference. In the apparatus described in U.S. Pat. No. 4,799,755, lens systems are not utilized in an output coupler. Rather, a fiber injecting lens is selected to have a focal length of sufficient length to enable the use, for materials processing, of the diverging beam emitted at an output end of the fiber without a need for a beam focusing lens-type output coupler.

An output coupler having a lens system therein for focusing a laser beam transmitted thereto through an optical fiber is disclosed in commonly assigned U.S. Pat. No. 4,844,574, entitled "Optical Fiber Output Coupler for a Power Laser", the disclosure of which is incorporated in its entirety herein by reference. The apparatus described in U.S. Pat. No. 4,844,574 includes a lens system that compensates for adverse effects of fiber transmission in order to improve focused spot power density of the fiber transmitted beam.

Still other known laser material processing systems utilize lens systems at an output of a laser source. Such systems are described in commonly assigned U.S. Pat. Nos. 3,419,321 and 4,275,288, entitled "Laser Optical Apparatus for Cutting Holes" and "Apparatus for Machining Material", respectively. In each of these systems, optical fibers are not utilized. Therefore, since a laser source generally is a stationary system, at least during a materials processing operation, lenses are aligned with the beam directly output by the laser source. The mobility of such systems is limited, therefore, the need for high power fiber optic beam delivery. If this laser beam is not properly delivered to the output coupler from the fiber output, the quality of the beam emitted from the output coupler will be adversely affected.

The beam quality out of an optical fiber has been shown to improve by injecting the optical fiber with long focal length lenses. Long lens injection into the fiber reduces the exiting beam divergence out of the fiber. Exemplary of such long is U.S. patent application Ser. No. 07/950,567, now U.S. Pat. No. 5,245,682, to A. L. Ortiz, Jr. entitled "Fiber Optic Delivered Beam Quality Control System for Power Lasers". The other method of improving the fiber delivered beam quality is by reducing the fiber core diameter. The use of small core diameter fibers require high beam core lasers such as a face pumped laser (FPL). The combination of fiber core diameter and long focal length injection can be optimized but there are definite limits. One such limit is the laser beam is spot sized which must be smaller than fiber diameter and cannot exceed the fiber numerical aperture (NA). Therefore, a more advantageous system, then, would be presented if the fiber optic delivered beam quality could be improved.

It is apparent from the above that there exists a need in the art for a fiber optic end preparation for improving fiber delivered beam quality for power lasers which is capable of adequately delivering the beam to the output coupler, and which at least equals the delivered characteristics of the known high power laser energy delivery systems, but which at the same time substantially increases the quality of the fiber optic delivered beam. It is a purpose of this invention to fulfill this and other needs in the art in a manner more apparent to the skilled artisan once given the following disclosure.

SUMMARY OF THE INVENTION

Generally speaking, this invention fulfills these needs by providing a method for improving a fiber optic delivered beam quality in a fiber optic having first and second ends including a power laser source and an output coupler having an inlet comprising the steps of preparing said fiber optic such that a cross-section of said second end of said fiber optic is smaller than a cross-section of said first end of said fiber optic; operating said power laser source to create a first laser beam having a first beam quality value; impinging said first laser beam on said first end of said fiber optic; transmitting said first laser beam through said fiber optic; impinging said first laser beam on said second end of said fiber optic; emitting said first laser beam from said second end of said fiber optic to create a second laser beam such that said second laser beam has a second beam quality value which is numerically higher than said first beam quality value; and impinging said second laser beam on said inlet of said output coupler.

In certain preferred embodiments, the fiber optic includes a tapered area having first and second cross sections such that the second cross section is smaller in diameter than the first cross section.

In another preferred embodiment, the fiber delivered beam quality is improved because the cross section of the second end of the fiber optic is smaller than the cross section of the first end of the fiber optic. This allows for the beam quality value to be reduced to improve the beam quality emitted by the fiber optic.

The preferred fiber optic delivered beam quality control system, according to this invention, offers the following advantages: increased quality of the beam delivered from the fiber output; good stability; good durability; good economy; and improved fiber delivered laser materials processing capability. In fact, in many of the preferred embodiments, the factor of increased beam quality from the fiber output is optimized to an extent that is considerably higher than heretofore achieved in prior, known high power laser and fiber optic energy delivery systems.

BRIEF DESCRIPTION OF THE DRAWINGS

The above and other features of the present invention which will be more apparent as the description proceeds are best understood by considering the following detailed description in conjunction with the accompanying drawings wherein like character represent the parts throughout the several veins and in which.

DETAILED DESCRIPTION OF THE INVENTION

Figure 1:
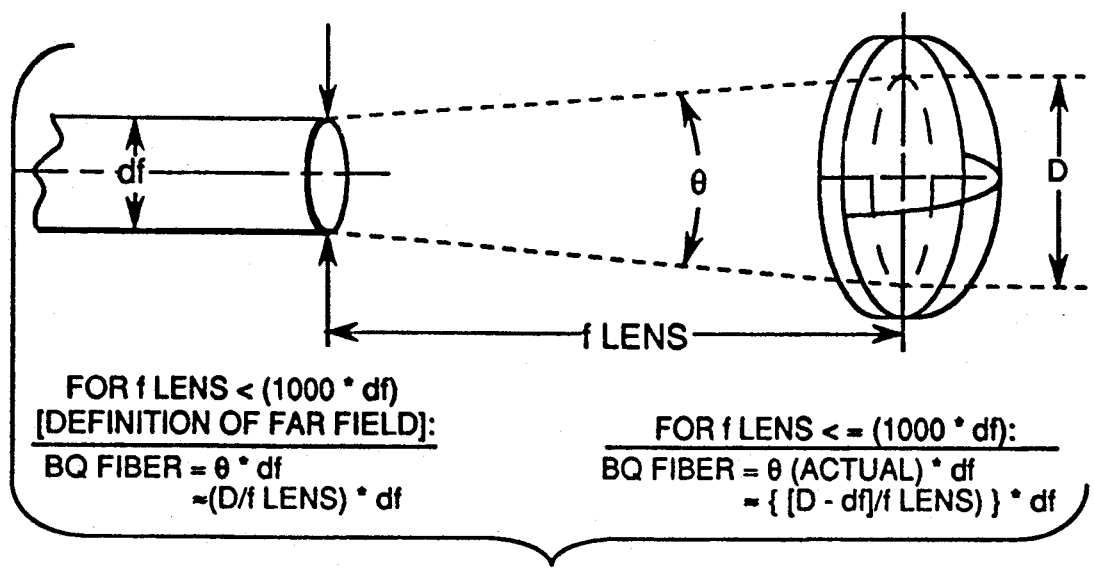
FIG. 1 is a diagrammatic illustration showing the characterization of fiber delivered beam quality, according to the present invention.

With reference first to FIG. 1, there is illustrated a diagrammatic drawing of fiber delivered beam quality. A characterization of the fiber output beam quality is achieved by measuring the fiber output beam divergence (full angle). The fiber delivered beam quality is determined by first calculating the fiber output for angle beam divergence This is calculated by:

$$\theta = \tan^{-1}(D/f) \quad (1)$$

where $\tan^{-}(D/f)$ is in mrads, D is the measured $1/e^2$ collimated beam diameter on the collimating lens in millimeters and f is the collimating lens focal length used for characterization in mm. Equation (1) can be approximated by $(D/f)$ for small angles. The fiber delivered beam quality (BQ) is how determined by:

$$BQ_{fib} = \theta \cdot df \quad (2)$$

where df is the fiber diameter in mm. It is obvious that as the fiber output divergence decreases, the fiber delivered beam quality improves. The lower the beam quality number (millimeter=milliradians) the better the beam quality. The fiber delivered beam quality also can be improved by using smaller diameter fibers.

Figure 2:
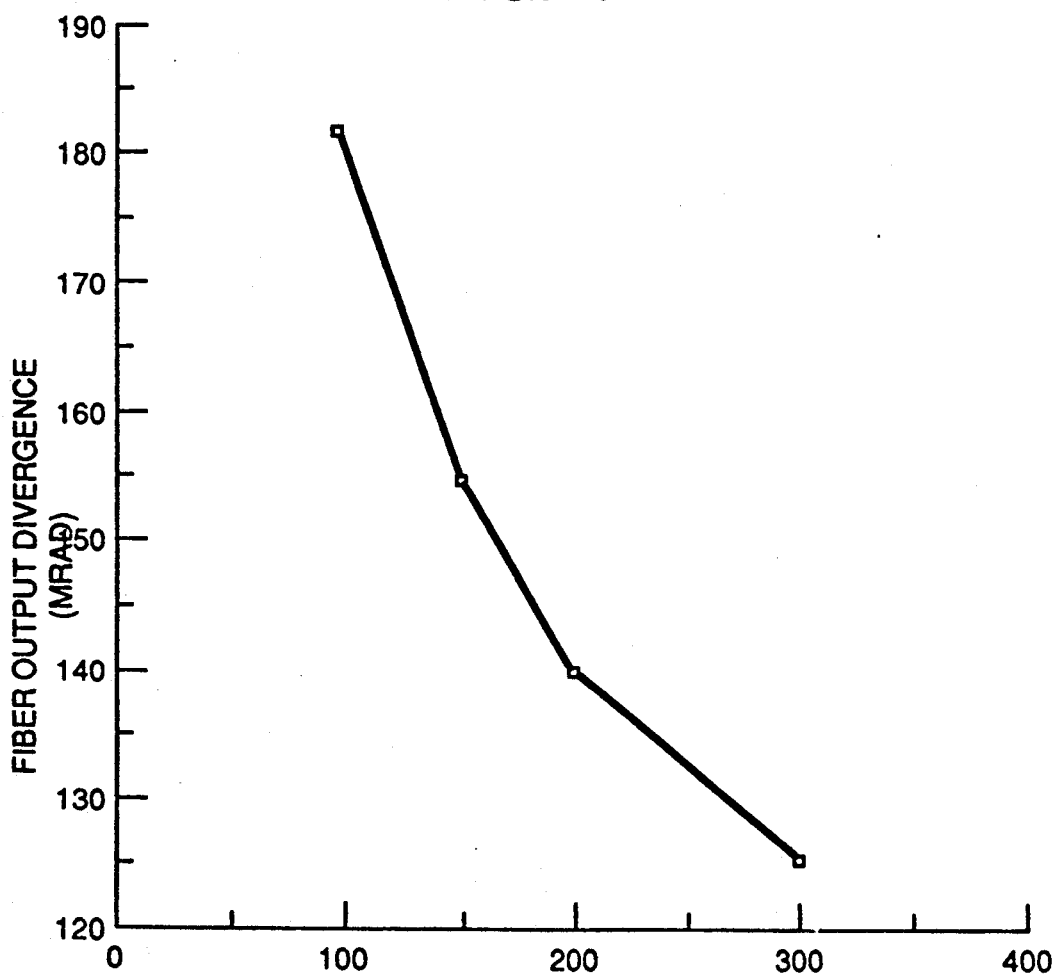
FIG. 2 is a graphical illustration of fiber optic divergence versus injection focal length.
Figure 3:
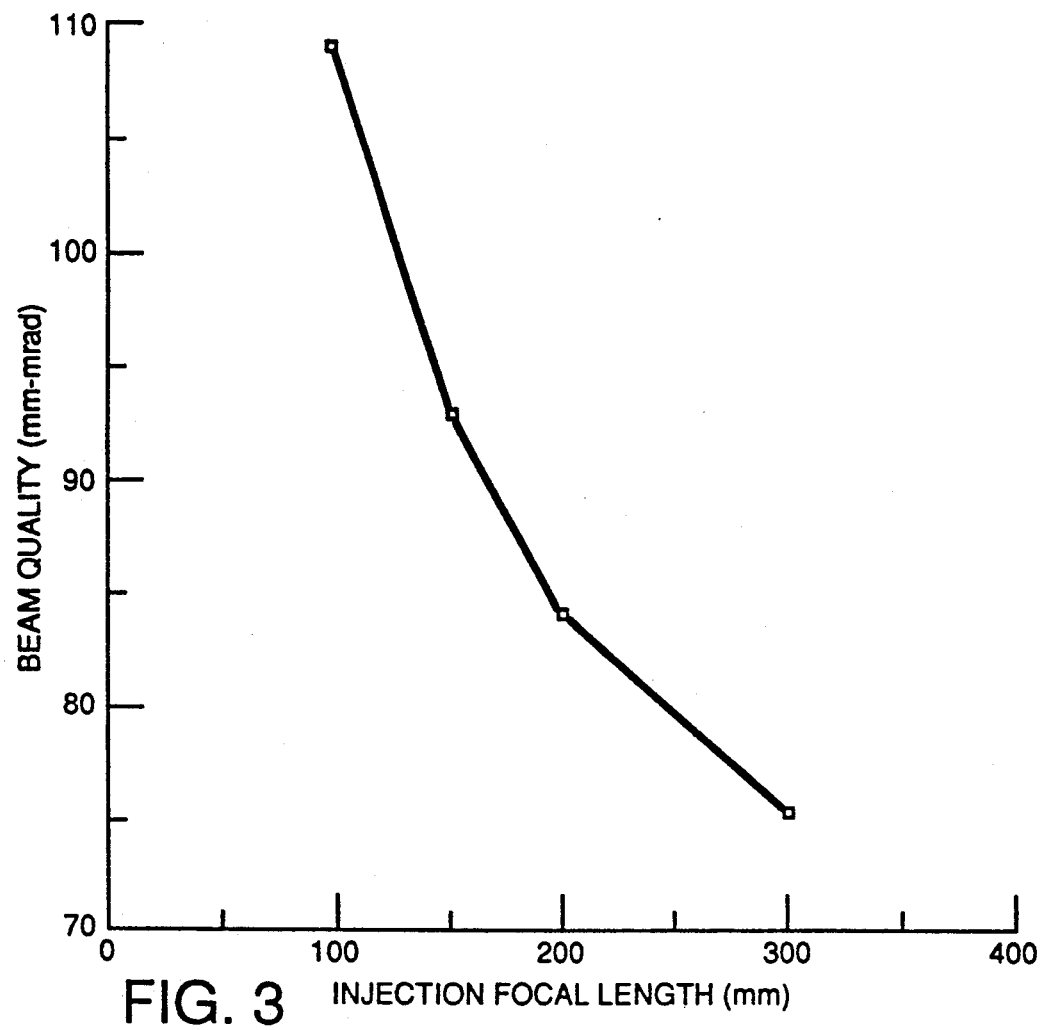
FIG. 3 is a graphical illustration of fiber delivered beam quality versus injection focal length.

It has been found that the fiber output divergence decreases as the focal length of the high power laser beam injection lens increases as shown in FIG. 2. Likewise, the fiber delivered beam quality is improved with longer injection lenses as shown in FIG. 3. As longer injection focal length lenses are used, the laser beam injection cone angle decreases. With fiber injection lenses ranging from 100 mm to 300 mm, the fiber delivered beam quality ranges from 110 mm-mrad to 75 mm-mrad for a conventional anhydraguide, fused silica core, 600 micron diameter step index fiber.

Figure 4:
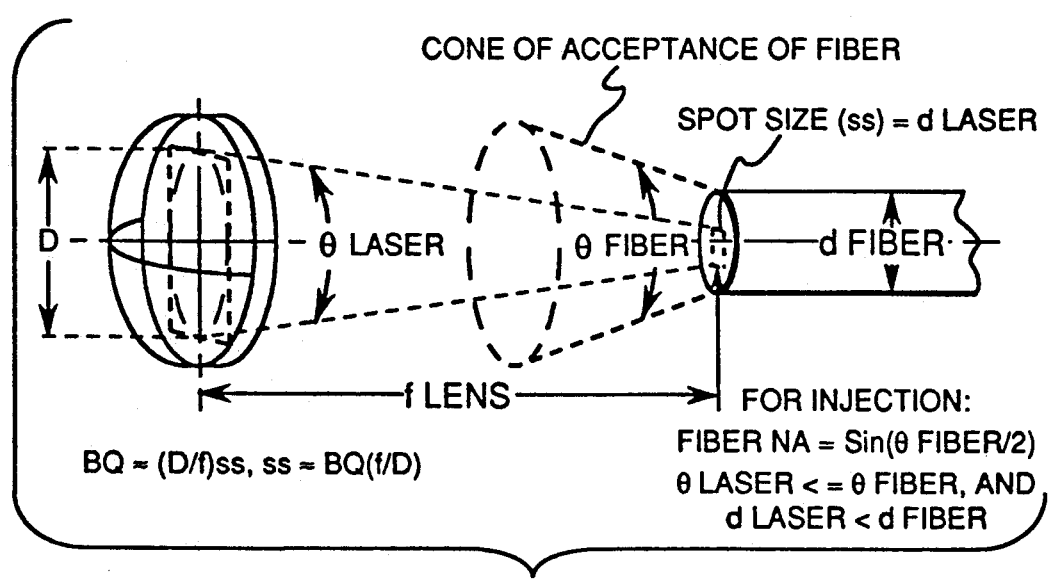
FIG. 4 is a diagrammatic illustration of the fundamentals used for laser injection into an optical fiber with a plano-convex lens.

FIG. 4 illustrates the fundamentals of laser injection into an optical fiber. A power laser beam with a beam quality (BQ) has a beam diameter (D) on the plano-convex lens. The simple formulae:

$$BQ = \tan^{-1}(D/f) \cdot ss, \text{ and} \quad (3)$$

$$FiberNA = \sin(\phi_{Fiber}/2) \quad (4)$$

where BQ equals the laser source beam quality in mm-mrad, $\tan^{-1}(D/f)$ is in radians, D equals $1/e^2$ laser beam diameter on the focusing lens in mm, f equals injection lens focal length in mm, ss=laser beam focus spot size (diameter) on the fiber tip in microns, Fiber NA defines the fiber numerical aperture, and $\phi_{Fiber}$ describes the acceptance cone angle of the fiber, provide the fundamental theory for high power laser injection into fibers. Equation (3) can be approximated by $BQ = (D/f) \cdot ss$ because $\tan^{-1}(D/f) = D/f$ for small angles. Solving for ss provides:

$$ss = BQ/\tan^{-1}(D/f) \quad (5)$$

Close approximation of equation (5) will reveal the standard equation used in laser focused spot size calculations as indicated by:

$$W_o = f \cdot \theta \quad (6)$$

where $W_o$ equals a focused laser spot radius, f equals the focusing lens focal length, and, $\theta$ the laser half angle beam divergence. For equation (5), BQ is in mm-mrad, $\tan^{-1}(D/f)$ is in radians thereby cancelling out the radians in the BQ term leaving the spot size dimension as $mm \times 10^{-3}$ or microns. For successful fiber injection:

$$\phi_{Laser} \leq 100 \, \phi_{Fiber} \quad (7)$$

and $$d_{Laser} = d_{Fiber} \quad (8)$$

where $\phi_{Laser}$ defines the injection cone angle of the laser beam injecting the fiber $\phi_{Fiber}$ describes the acceptance cone angle of the fiber, $d_{Laser}$ describes the diameter of the focused laser beam on the fiber input face, and $d_{Fiber}$ is the fiber core diameter in FIG. 4. The fiber numerical aperture (NA) is typically determined by the fiber core and cladding material used in the fiber optic manufacturing process.

Figure 5:
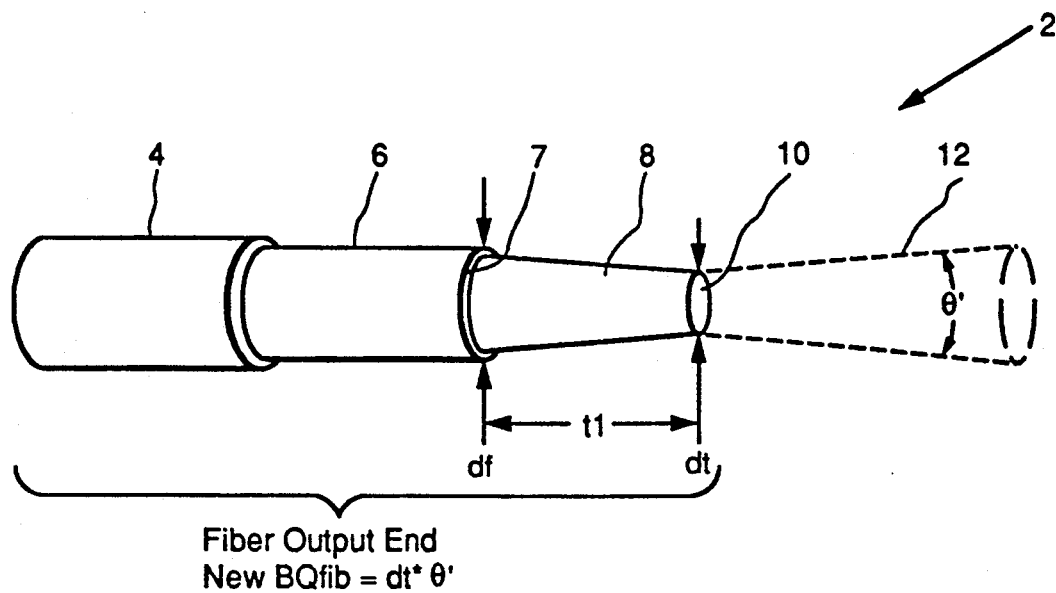
FIG. 5 is a fiber optic end preparation for improving fiber delivered beam quality for high power laser beams, according to the present invention.

The preferred embodiment is shown in FIG. 5. As shown in FIG. 5, fiber optic 2 includes, in part, conventional nylon jacket 4, conventional polymeric cladding 6, fiber core (taper) 8, fiber core face 10, and laser beam 12. In particular, fiber core 8 (dt) is tapered along the distance $t_1$ such that the fiber core face 10 (dt) is smaller in cross section than fiber optic core 7 (df). Also, laser beam 12 is emitted from fiber core face 10 at an angle $\theta'$. Laser beam 12 impinges upon an inlet of a conventional output coupler (not shown). Such an output coupler is described in commonly assigned U.S. Pat. Nos.

4,844,754 and 4,997,250, entitled "Optical Fiber Output Coupler for a Power Laser" and "Fiber Output Coupler with Beam Shaping Optics for Laser Material Processing Systems", respectively.

The new feature in the fiber end preparation is the introduction of the taper 8 along the fiber tip length Lt. As discussed earlier, the fiber output beam quality is directly influenced by the fiber core diameter (dt) at face 10. By introducing the taper 8 at the fiber output, the beam quality of the output beam 12 may improve because we have now forced the fiber core diameter (dt) to be smaller. If the taper is linear, the exit divergence will increase almost proportionately, thereby, providing a little improvement. Typically, the standard fiber core diameter is approximately 600 microns. Using the taper 8 on the tip of fiber, the final taper diameter is, preferably, 400 microns or smaller as long as the fiber numerical aperture is not exceeded. The advantage of placing the taper 8 on the tip of fiber core is that the fiber losses will remain the same throughout the entire length of fiber optic 2 until the taper is reached.

Likewise, the cost of a 15 meter tapered fiber is substantially higher than a fiber with a tapered output tip. Exemplary of a long tapered fiber is set forth in U.S. Pat. No. 4,654,532, ('532) to T. B. Hirschfeld, entitled "Apparatus for Improving the Numerical Aperture at the Input of a Fiber Optics Device". While the '532 patent discloses the use of a taper, the taper is used to increase the number of bounces of the light wave which, in turn, improves or increases the numerical aperture for easier laser beam injection. The use of the taper is used for total internal reflective transmission which permits the use cladding material of ordinary refractive index to be used adjacent to the portion where the fiber is mounted or held. The '532, patent does not employ a taper to improve the fiber optic beam quality for power lasers. Also, with respect to the '532, patent, the taper type, i.e. parabolic taper (positive or negative), parabolic/linear combination taper, final taper diameter and taper length can be optimized to minimize losses while taking advantage of and using the air around the fiber core as the final cladding. If the taper takes place along the entire fiber length, as in the '532 patent, non-linear losses begin to accumulate because, as the beam propagates down the fiber, the number of bounces increases. This can potentially cause the internal reflections of the laser beam to approach the fiber numerical aperture (NA), thereby causing significant laser power losses and optical fiber failure in high average laser power applications exceeding 50 watts.

The preferred procedure is for polymer clad, step index, fused silica core fibers but is not so limited. In particular, the preparation of the fiber optic 2, a one inch section of jacket 4 is mechanically stripped away by conventional techniques, thus, leaving one inch of cladding 6 plus fiber core 8 exposed. Approximately one-half of an inch of cladding 6 is then chemically stripped away by conventional techniques thus, leaving one half of an inch of fiber core 8 exposed. Fiber core 8 is then inserted in a conventional fumed silica manipulator and stretched until the desired taper length and taper diameter are achieved. Next, the fiber core 8 is cleaned by conventional techniques in the region of the desired final taper diameter. A conventional Buehler fiber polisher is used to polish the taper face by using a 3 micron silicon carbide polishing disc for approximately 5 minutes. The polishing step is repeated at 5 minute intervals using 1 and 0.3 micron conventional aluminum oxide polishing discs. The final polish is completed by using a Rhodes Hastilite 919 Rare Earth Polish, manufactured by James H. Rhodes and Company, Hicksville, New York, for approximately 5 minutes. Glass clad fibers can also be used with a slight procedural modification.

Figure 6:
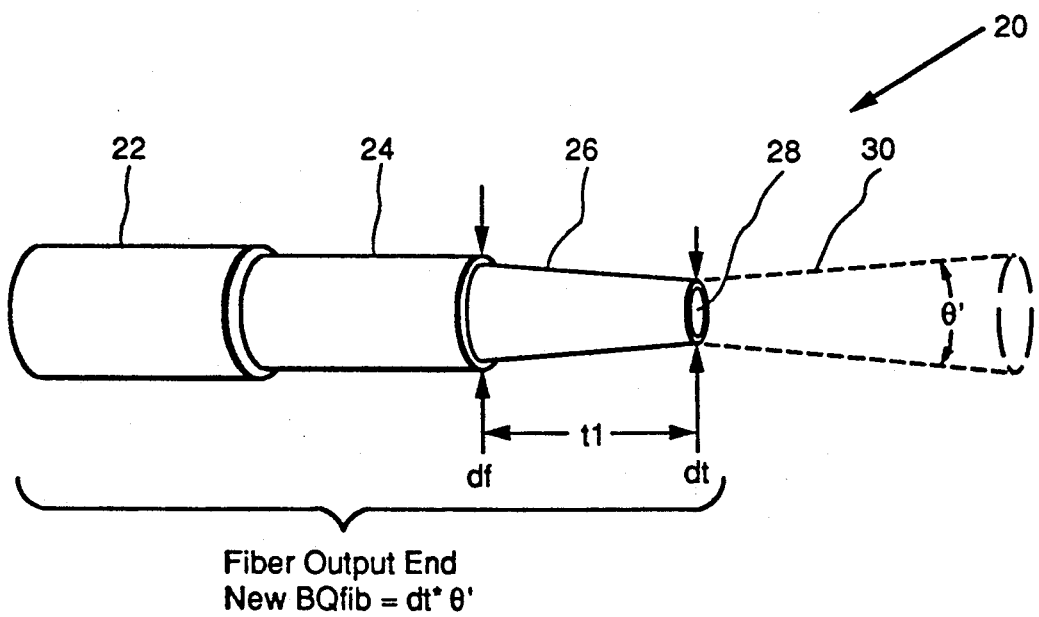
FIG. 6 is another embodiment of a fiber end preparation for improving fiber delivered beam quality of high power laser beams, according the present invention.

As shown in FIG. 6, the glass clad fiber 20 includes, in part, conventional nylon jacket 22, conventional buffer 24, tapered core and cladding 26, output face 28 and laser beam 30. In glass clad fiber 20, the cladding cannot be stripped away, so the glass cladding and core 26 must be treated as an integral body. Buffer 24, which is typically found on glass clad fibers can be chemically stripped away as in polymer clad fibers. Also, as shown in FIG. 6, laser beam 30 is emitted from fiber optic output face 28 at an angle ($\theta$).

Other fiber types can also be prepared using this fiber end procedure. Graded index, polarization preserving, plastic core, fluoride core, chalcogenide core, radiation hardened, metallized, acrylate coated, thermocoated, Low OH core and High OH core.

Once given the above disclosure, many other features, modification or improvements will become apparent to the skilled artisan. Such features, modifications or improvements are, therefore, considered to be a part of this invention, the scope of which is to be determined by the following claims.

What is claimed is:

1. A method for delivering a laser beam, from a power laser source to an output coupler having an inlet, comprising the steps of:
   preparing a fiber optic having a stretched fiber output tip, said fiber optic tapered only at its fiber output tip, said fiber output tip tapered along its entire fiber output tip length, and said fiber optic having first and seconds ends such that a cross-section of said second end of said fiber optic is smaller than a cross-section of said first end of said fiber optic;
   operating said power laser source to create a first laser beam;
   impinging said first laser beam on said first end of said fiber optic wholly within said cross-section of said first end;
   emitting said first laser beam from said second end of said fiber optic to create a second laser beam; and
   impinging said second laser beam on aid inlet of said output coupler.

2. The method, as in claim 1, wherein said cross-section of said first end is generally a circle having a diameter of approximately 600 microns.

3. The method, as in claim 1, wherein said cross-section of said second end is generally a circle having a diameter of 400 microns or less.

4. A method for preparing a fiber optic having a jacket, a cladding and a fiber core, wherein said method is comprised of the steps of:
   stripping a predetermined portion of said jacket from said fiber optic to substantially expose said cladding and said fiber core;
   stripping a predetermined portion of said cladding from said fiber optic to substantially expose said fiber core;
   stretching said fiber core until a predetermined taper length and taper diameter are achieved;
   cutting said fiber core such that said predetermined taper length and taper diameter are achieved; and
   polishing said tapered fiber core.

5. A method as in claim 4, wherein said method is further comprised of:

long focal length injection of a laser beam.

6. A method for preparing a fiber optic having a jacket, a buffer and a cladding/fiber core, wherein said method is comprised of the steps of:

stripping a predetermined portion of said jacket from said fiber optic substantially expose said buffer and said cladding/fiber core;

stripping a predetermined portion of said buffer from said fiber optic to substantially expose said cladding/fiber core;

stretching said cladding/fiber core until a predetermined taper length and taper diameter are achieved;

cutting said cladding/fiber core such that said predetermined taper length and taper diameter are achieved; and polishing said tapered cladding/fiber core.

7. A method as in claim 6, wherein said method is further comprised of:

long focal length injection of a laser beam.

* * * * *